United States Patent
Enomoto et al.

(10) Patent No.: US 6,628,317 B2
(45) Date of Patent: Sep. 30, 2003

(54) OPTICAL PRINTER WITH MICROMIRROR DEVICE

(75) Inventors: Jun Enomoto, Kanagawa (JP); Hiroaki Nakamura, Kanagawa (JP); Jun Fukazawa, Kanagawa (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 16 days.

(21) Appl. No.: 09/782,053

(22) Filed: Feb. 14, 2001

(65) Prior Publication Data

US 2001/0015750 A1 Aug. 23, 2001

(30) Foreign Application Priority Data

Feb. 17, 2000 (JP) ......................................... 2000-040124

(51) Int. Cl.7 ............................ B41J 2/435; B41J 2/385
(52) U.S. Cl. ........................ 347/234; 347/348; 347/116
(58) Field of Search ............................... 347/234, 232, 347/239, 248, 255, 262, 116; 348/625, 764, 770, 771, 755

(56) References Cited

U.S. PATENT DOCUMENTS 5,258,775 A * 11/1993 Casey et al. ................. 347/255
5,331,338 A * 7/1994 Mager ........................... 347/248
5,402,184 A * 3/1995 O'Grady et al. ............... 348/764
5,760,817 A * 6/1998 Foote et al. .................... 347/248
6,340,994 B1 * 1/2002 Margulis et al. ............... 348/625

FOREIGN PATENT DOCUMENTS

JP  9-164727   6/1997  ............ B41J/2/525
JP  9-314910  12/1997  ............ B41J/2/525

* cited by examiner

Primary Examiner—Hai Pham
(74) Attorney, Agent, or Firm—Sughrue Mion, PLLC

(57) ABSTRACT

An optical printer has a DMD as a spatial light modulator. An optical image corresponding to a fraction of a picture frame is projected from the DMD onto a photographic paper at a predetermined time interval. The photographic paper is advanced intermittently by a length corresponding to an exposure area for one optical image. A fluctuation value from a set advanced length for one advancing step is detected at each advancing step and accumulated. The DMD is mounted on a swinging plate whose angle is controllable by a piezoelectric element, to shift the exposure position on the photographic paper. In accordance with an accumulated fluctuation value, drive voltage to the piezoelectric element is changed from a reference value to correct the exposure position so as to print the picture frame without any gap or overlap between the fractions.

9 Claims, 7 Drawing Sheets

OPTICAL PRINTER WITH MICROMIRROR DEVICE

BACKGROUND OF THE INVENTION

1. Field of the Invention

The present invention relates to an optical printer with a spatial light modulator constituted of a micromirror device having a large number of very small mirrors with variable reflecting direction.

2. Background Arts

Optical printers print pictures, including characters and drawings, on photosensitive materials, such as photographic paper. Of the optical printers, color photographic printers that project an optical image of a picture frame from negative photographic film onto photographic paper have been widely used. Recently, digital optical printers have been developed and used in practice that drive a display device in accordance with digital image data to print a picture by projecting printing light beams or an optical image from the display device onto a photosensitive material. As the digital optical printers, there are CRT type, Laser type, LCD type, micromirror type and so forth.

The micromirror type optical printer uses a spatial light modulator constituted of an array of a large number of very small mirrors, called a micromirror array. The micromirror array is arranged in a row or in a matrix, i.e. in a plurality of rows. The micromirrors may tilt each individually to reflect a spot light beam in a variable direction. Exemplars of the micromirror type optical printers are disclosed in Japanese Laid-open Patent Application Nos. 9-164727 and 9-314910. Since the micromirror type optical printer utilizes reflection of mirrors, the attenuation of light is smaller than other types, so the printing light is most efficiently utilized. Of the micromirror type spatial light modulator, there are digital micromirror devices (DMD) and piezo-drive type micromirror device (AMD). The DMD uses electrostatic power to make the micromirrors incline, whereas the AMD uses very small piezoelectric elements to make the micromirrors incline.

In the optical printers, each micromirror of the DMD and AMD corresponds to one pixel. In some of the DMD and AMD, the micromirror array corresponds in pixel number and frame size to one picture frame to print. In other types, the micromirror array corresponds to a fraction of one picture frame, i.e. several lines or several tens of lines of one picture frame. Where the DMD or the AMD corresponds to one picture frame, the photosensitive material is advanced by one frame after the entire picture is printed. Where the DMD or the AMD corresponds to a fraction of one picture frame, the picture is printed one fraction after another while advancing the photosensitive material one fraction after the printing of one fraction.

In the latter type, since the photosensitive material is advanced several steps per one picture frame, if the advanced length fluctuates in one step, a gap or an overlap is provided between the preceding fraction and the next fraction. The gap or the overlap respectively appears as a white stripe or a black stripe, and deteriorates the quality of the photograph.

SUMMARY OF THE INVENTION

In view of the foregoing, an object of the present invention is to provide an optical printer, wherein a picture is printed while advancing the photosensitive material several steps per one picture frame, whereby the printed picture frame does not suffer any gap or overlap even if the advanced length of the photosensitive material fluctuates.

To achieve the above object in an optical printer that comprises a spatial light modulator having an array of micromirrors arranged in a row or in a matrix, the micromirrors being able to tilt each individually between an effective reflecting position and an ineffective reflecting position; a driving device for driving each of the micromirrors in accordance with image data to tilt either to the effective reflecting position or to the ineffective reflecting position; a light source section for illuminating the micromirrors; an image projecting optical system for projecting printing light beams from those ones of the micromirrors which are in the effective reflecting position, as an optical image of a predetermined size onto a photosensitive material; and an advancing device for advancing the photosensitive material intermittently by a length corresponding to the size of the optical image, the present invention suggests providing a detection device for detecting fluctuations in advanced length of the photosensitive material by the paper advancing device; and a correction device for correcting projecting position of the optical image on the photosensitive material on the basis of fluctuation values detected by the detection device, by displacing the spatial light modulator.

According to another aspect of the invention, projecting position of the optical image on the photosensitive material is corrected by displacing a member of the image projecting optical system on the basis of fluctuation values detected by the detection device.

According to a preferred embodiment, the correction device accumulates fluctuation values detected by the detection device, to correct the image projecting position on the photosensitive material on the basis of an accumulated fluctuation value. The correction device also controls the paper advancing device to change the length of advancement of the photosensitive material when the accumulated fluctuation value goes beyond a range within which the image projecting position is correctable by the displacement of the spatial light modulator, so as to reduce the accumulated fluctuation value to be within the range.

The correction device preferably comprises a piezoelectric element for displacing the spatial light modulator.

BRIEF DESCRIPTION OF THE DRAWINGS

The above and other objects and advantages of the present invention will become apparent from the following detailed description of the preferred embodiments when read in association with the accompanying drawings, which are given by way of illustration only and thus are not limiting the present invention. In the drawings, like reference numerals designate like or corresponding parts throughout the several views, and wherein.

DETAILED DESCRIPTION OF THE EMBODIMENTS

Figure 1:
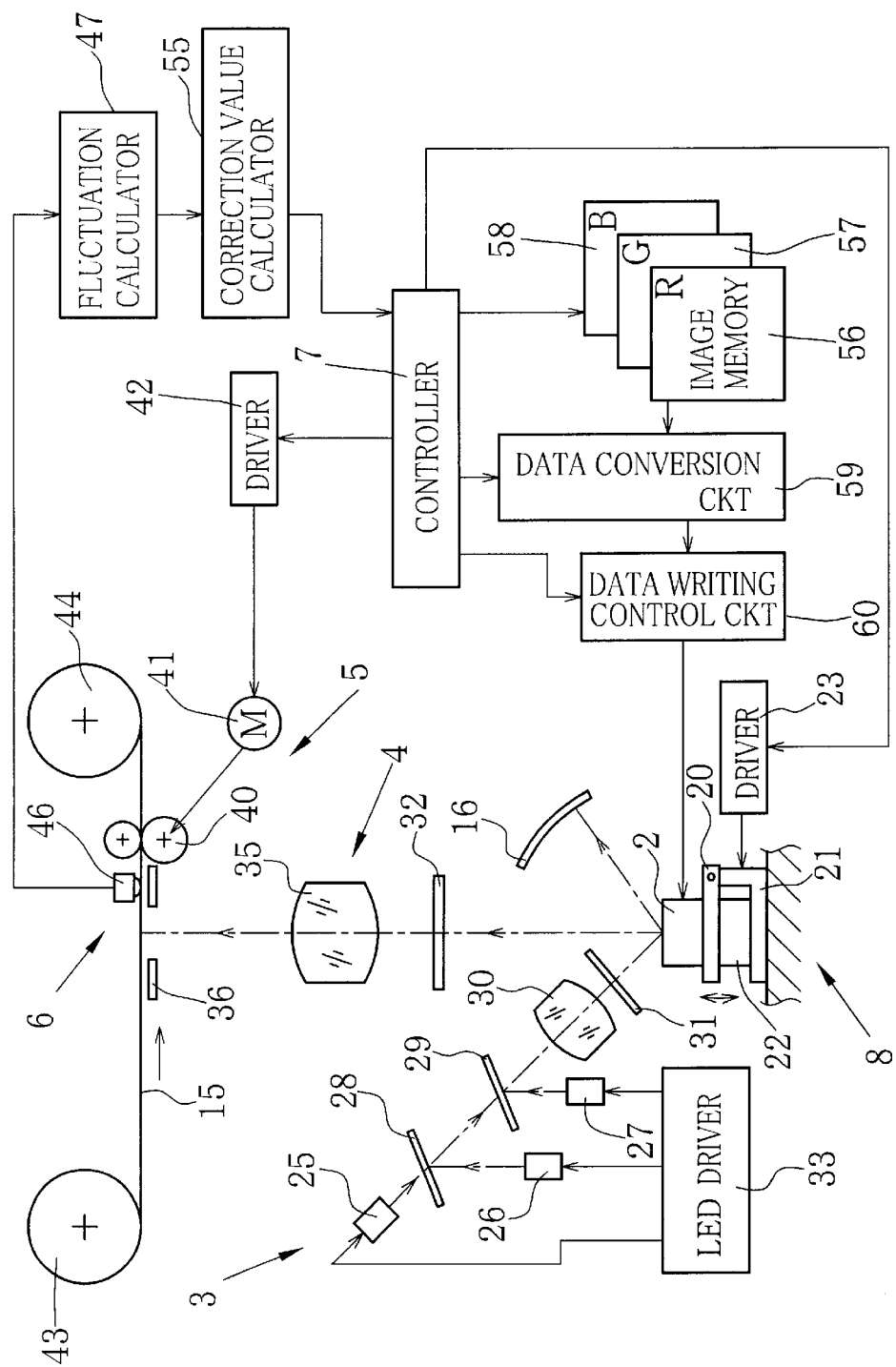
FIG. 1 is a schematic diagram illustrating an optical printer according to an embodiment of the present invention.

In FIG. 1, an optical printer according to an embodiment of the present invention has a digital micromirror device (DMD) 2 as a spatial light modulator, a light source section 3 for illuminating the DMD 2, an image projecting optical system 4, a paper advancing section 5, a detector section 6 for detecting fluctuation in advanced length of a color photographic paper 15, a controller 7 and an exposure position correcting section 8.

Figure 2:
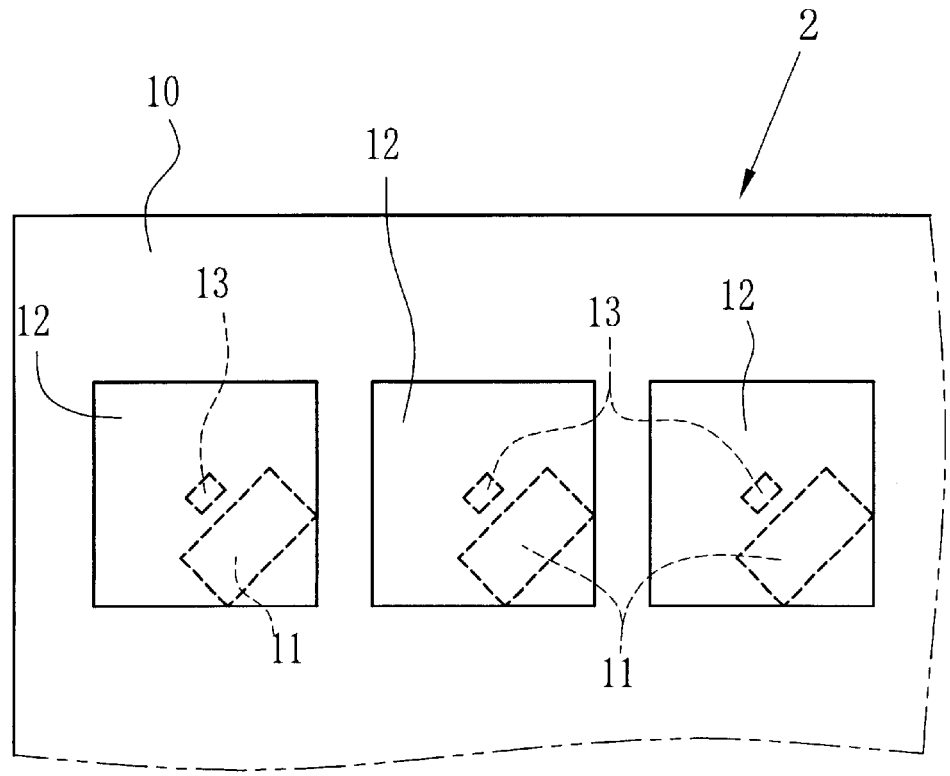
FIG. 2 is an enlarged fragmentary top plan view illustrating a digital micromirror device used as a spatial light modulator.
Figure 3:
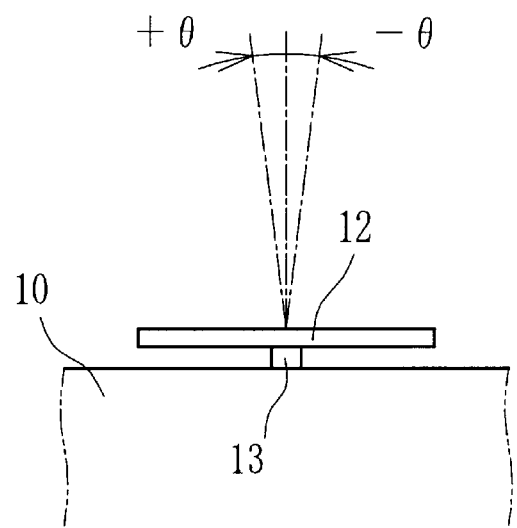
FIG. 3 is a side view of one segment of the digital micromirror device, illustrating the operation of the digital micromirror device.

As shown in FIG. 2, the DMD 2 has a large number of memory cells 11 formed on a statistic RAM (SRAM) 10. Above each of the memory cells 11 is disposed a micromirror 12, a very small square mirror chip, e.g. 16 μm on a side, made of conductive metal foil, e.g. aluminum foil. As shown in FIG. 3, the micromirror 12 is supported at its center on a post 13 so as to be able to tilt about the post 13. The micromirror 12 is tilted by an electrostatic force generated between the memory cell 11 and the micromirror 12. The memory cell 11, the micromirror 12 and the post 13 are formed according a well-known integration technique. The micromirrors 12 are arranged in a matrix, i.e. in a plurality of rows.

While the micromirror 12 is not supplied with electric power, the micromirror 12 is held horizontal to a top surface of the SRAM 10. The micromirror 12 is tilted from this horizontal initial position in response to mirror drive data being written on the corresponding memory cell 11. Each memory cell 11 may store 1-bit, so the mirror drive data is 1-bit data. The micromirror 12 tilts by an angle +θ when the written mirror drive data is "1", or by an angle −θ when the written mirror drive data is "0". Accordingly, the micromirror 12 may rock through an angular range of 2θ.

According to the present embodiment, when the micromirror 12 tilts by +θ, it directs light from the light source section 3 toward the photographic paper 15 as placed in a printing station behind a paper mask 36. Thus, the position tilted by +θ may be called an effective reflecting position, and spot light beams reflected from those micromirrors being in the effective reflecting position and directed toward the photographic paper 15 may be called printing light beams. In the initial horizontal position and the other tilted position, the light reflected from the micromirror 12 is not directed to the photographic paper 15. While the micromirror 12 tilts by −θ, the reflected light is directed to a light absorbing plate 16, so this position may be called ineffective reflecting position.

As shown in FIG. 1, the DMD 2 is fixed on a top side of a swinging plate 20 that is mounted to a mounting base frame 21 through a mounting axle such that the swinging plate 20 may swing up and down about the mounting axle. On the swinging plate 20, the top surface of the SRAM 10 is held substantially parallel to an advancing direction of the color photographic paper 15, as shown by an arrow in FIG. 1, and the mounting axle of the swinging plate 20 extends perpendicularly to the advancing direction. A piezoelectric element 22 is also mounted to the mounting base frame 21. As well-known in the art, the piezoelectric element 22 is constituted of piezoelectric crystals, such as PZT, or piezoelectric ceramics, and is displaced when a voltage is applied across its opposite end faces. As a result of displacement of the piezoelectric element 22, the swinging plate 20 swings slightly about the mounting axle, so the top surface of the SRAM 10 is inclined by a slight angle, and thus the projecting position of the printing light beams on the photographic paper 15, that may be called the exposure position, is slightly displaced in the advancing direction. The piezoelectric element 22 is driven by the controller 7 through a driver 23. These elements 20 to 23 constitute the exposure position correcting section 8.

Figure 4:
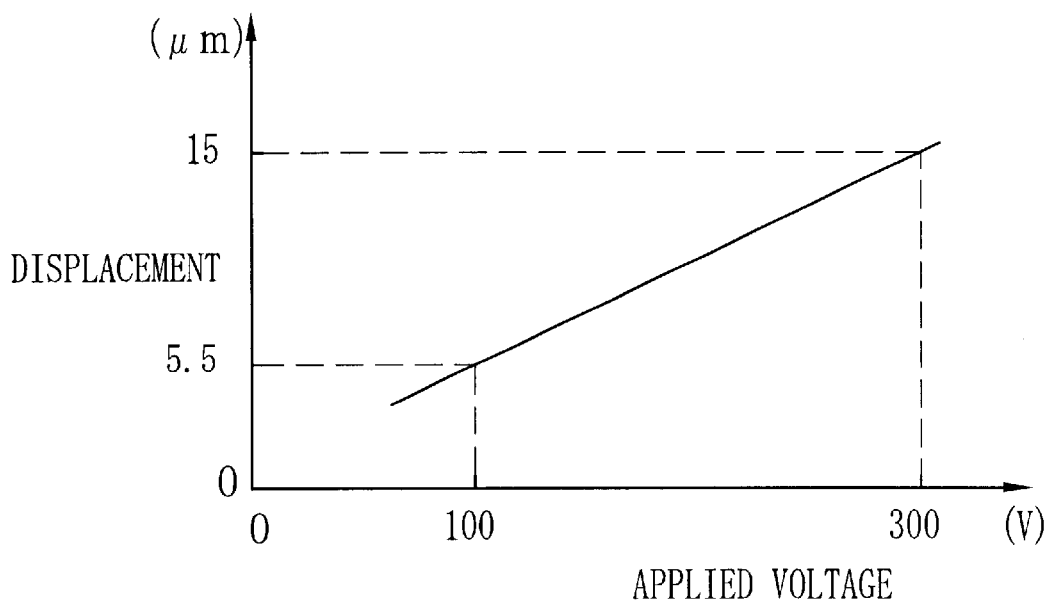
FIG. 4 is a graph illustrating a relationship between voltage applied to a piezoelectric element and amount of displacement of the piezoelectric element.

As shown for example in FIG. 4, the piezoelectric element 22 is displaced the more, the higher voltage is applied across the piezoelectric element 22. In this example, the amount of displacement is 5.5 μm at 100 V, and 15 μm at 300 V.

The light source section 3 consists of a red LED device 25, A green LED device 26, a blue LED device 27, first and second dichroic mirrors 28 and 29, a convergent lens 30, and a balance filter 31. The red LED device 25 is constituted of a large number of red LEDs arranged in a matrix on a substrate to emit red rays from an area. The green LED device 26 and the blue LED device 27 are respectively constituted of green LEDs and blue LEDs in the same way as the red LED device 25. These LED devices 25 to 27 are driven one after another by an LED driver 33 under the control of the controller 7, for photographing a full-color image on the color photographic paper 15 in a three-color frame sequential fashion. The LED driver 33 controls light intensity of each of the LED devices 25 to 27 to adjust exposure amounts and color balance to characteristics of the color photographic paper 15 that vary depending upon the paper types. Because the LEDs are superior in responding properties, the LED devices begin to emit rays at a desired intensity in a short time.

The first dichroic mirror 28 allows the red rays from the red LED device 25 to pass through it, and reflects green rays from the green LED device 26. The second dichroic mirror 29 allows the red rays and the green rays to pass through it, but reflects blue rays from the blue LED device 27. The convergent lens 30 converges the rays from the individual LED devices 25 to 27 to illuminate the entire area of the DMD 2.

The image projecting optical system 4 is constituted of a balance filter 32 and a projection lens 35 having a fixed magnification of projection. The projection lens 35 focuses the printing light beams from the micromirrors 12 onto a photosensitive surface of the color photographic paper 15 in an area of a constant size while the color photographic paper 15 stops in a printing station framed by a paper mask 36. The area of the constant size that is exposed concurrently to the printing light beams may be called an exposure area. The balance filters 31 and 32 are for correcting shading of the rays traveling through the filters, to reduce unevenness in the light amount.

The paper advancing section 5 is provided with a pair of paper feed rollers 40 and a paper feed motor 41 for rotating the paper feed rollers 40. The paper feed motor 41 is driven by a driver 42 under the control of the controller 7, such that the color photographic paper 15 is advanced stepwise from a paper supply roll 43, by a length corresponding to the exposure area, in synchronism with projection intervals of the printing light. While the color photographic paper 15 stops, three color images are sequentially recorded on the same exposure area that is placed in the printing station behind the paper mask 36. The exposed area of the color photographic paper 15 is wound up onto a take-up roll 44, as the color photographic paper 15 is advanced by one step to place a next unexposed area in the printing station. In the present embodiment, the exposure area is equal in size to a fraction of a picture frame, e.g. one fourth of the picture frame, so the color photographic paper 15 is advanced several steps, e.g. four steps in this instance, for printing one picture frame.

Figure 5:
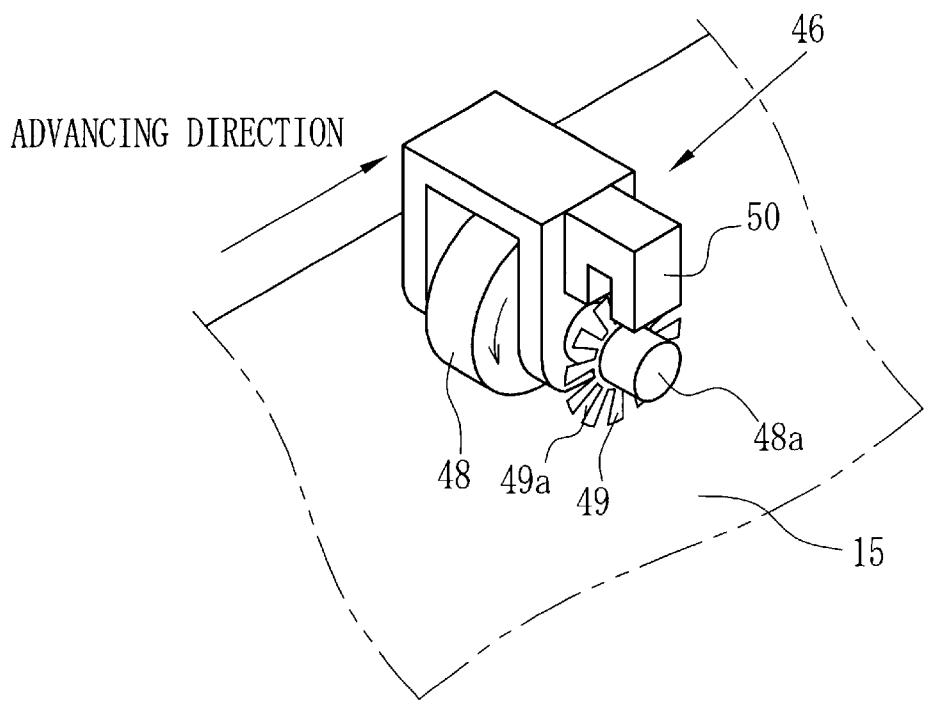
FIG. 5 is a schematic diagram illustrating a rotary encoder.

The detector section 6 is constituted of a rotary encoder 46 for detecting advanced length of the color photographic paper 15 and a fluctuation calculator 47 for calculating a fluctuation in the advanced length of the color photographic paper 15. As shown in FIG. 5, the rotary encoder 46 is constituted of a roller 48, a slit disc 49 and a pulse generator 50. The roller 48 is in contact with the color photographic paper 15 so as to be rotated by the movement of the color photographic paper 15. The slit disc 49 is fixed to a roller shaft 48a of the roller 48, so the slit disc 49 rotates together with the roller 48. The pulse generator 50 detects slits 49a of the slit disc 49, and generates a pulse for each slit. The encoder pulses from the pulse generator 50 are sent to the fluctuation calculator 47. It is possible to couple the slit disc 49 to the roller shaft 48a through a gear train for the sake of improving accuracy of measurement of the advanced length.

The fluctuation calculator 47 counts the number of pulses from the pulse generator 50, and calculates an advanced length by multiplying an obtained count value by a length of advancement corresponding to one encoder pulse. Then, the subsequent advanced length is compared to a set length that is equal to a length L1 of one exposure area in the paper advancing direction, to detect a difference between these advanced lengths as a fluctuation value ΔL. The fluctuation value ΔL detected at each advancing step of the color photographic paper 15 is accumulated during the printing of one picture frame.

The accumulated fluctuation value ΣΔL is sent to a correction value calculator 55, which derives a drive voltage for the piezoelectric element 22 from the accumulated fluctuation value ΣΔL by means of a lookup table (LUT) stored in the correction value calculator 55. The LUT shows a correlation between the drive voltage and the accumulated fluctuation value ΣΔL, as shown for example in FIG. 6, that is previously obtained through experiments. The drive voltage derived from the accumulated fluctuation value ΣΔL is sent to the controller 7.

In the present embodiment, the drive voltage applied across the piezoelectric element 22 is set at a reference value Vs in a normal condition where the accumulated fluctuation value ΣΔL is zero, and the printing light is to be projected on a normal exposure position. With an increase in the accumulated fluctuation value ΣΔL, the drive voltage is raised from the reference value Vs. As the accumulated fluctuation value ΣΔL decreases from zero, the drive voltage is lowered from the reference value Vs.

To the controller 7 are connected also three color image data memories 56, 57 and 58, a data conversion circuit 59 and a data writing control circuit 60. Although it is not shown in the drawings, an external image processing apparatus is also connected to the controller 7, for inputting image data of a picture to print into the controller 7 after processing the image data to control gray balance, gradation, density and saturation of the image. The controller 7 writes the entered image data for each color in the image data memories 56 to 58, and reads out the image data sequentially from the image data memories 56 to 58 in synchronism with driving intervals of the three color LED devices 25 to 27. For instance, while the red LED device 25 is being driven, the image data for red is read out from the red image memory 56.

Figure 7:
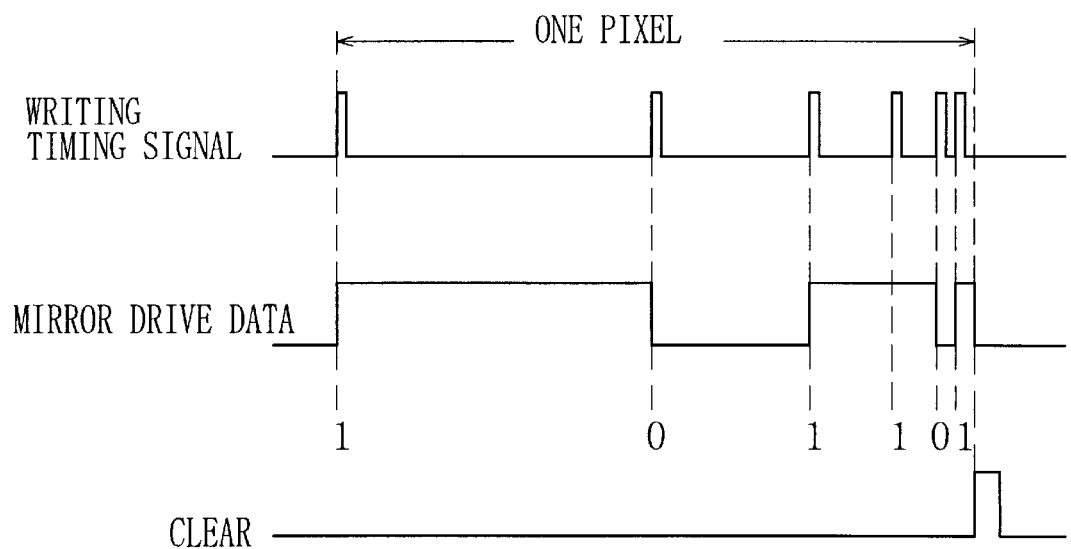
FIG. 7 shows timing charts of examples of signals used for printing a pixel.

The data conversion circuit 59 picks up the image data of each pixel one bit after another in the order from the most significant digit, and sends each bit of the image data as the mirror drive data to the data writing control circuit 60. The data writing control circuit 60 writes the mirror drive data on each of the memory cells 11 of the SRAM 10 at intervals determined by a writing timing signal that is supplied from the controller 7. The mirror drive data is written on the memory cell 11 a constant number of times per one pixel, the constant number being determined by the bit number of the image data for one pixel. According to the embodiment shown in FIG. 7, the writing timing signal is generated at intervals decreasing half the preceding interval within a printing cycle for one pixel. That is, the image data of each pixel is subjected to a pulse duration modulation when each bit of the image data is seriatim written as the mirror drive data on the memory cell 11. In results, the color photographic paper 15 is exposed to the printing light by a different amount for each pixel in correspondence with the image data of the individual pixel.

It is to be noted that the image data may be converted into the mirror drive data in a different way from the above embodiment, for example, in a way as disclosed in the above mentioned Japanese Laid-open Patent Application No. 9-164727.

Figure 8:
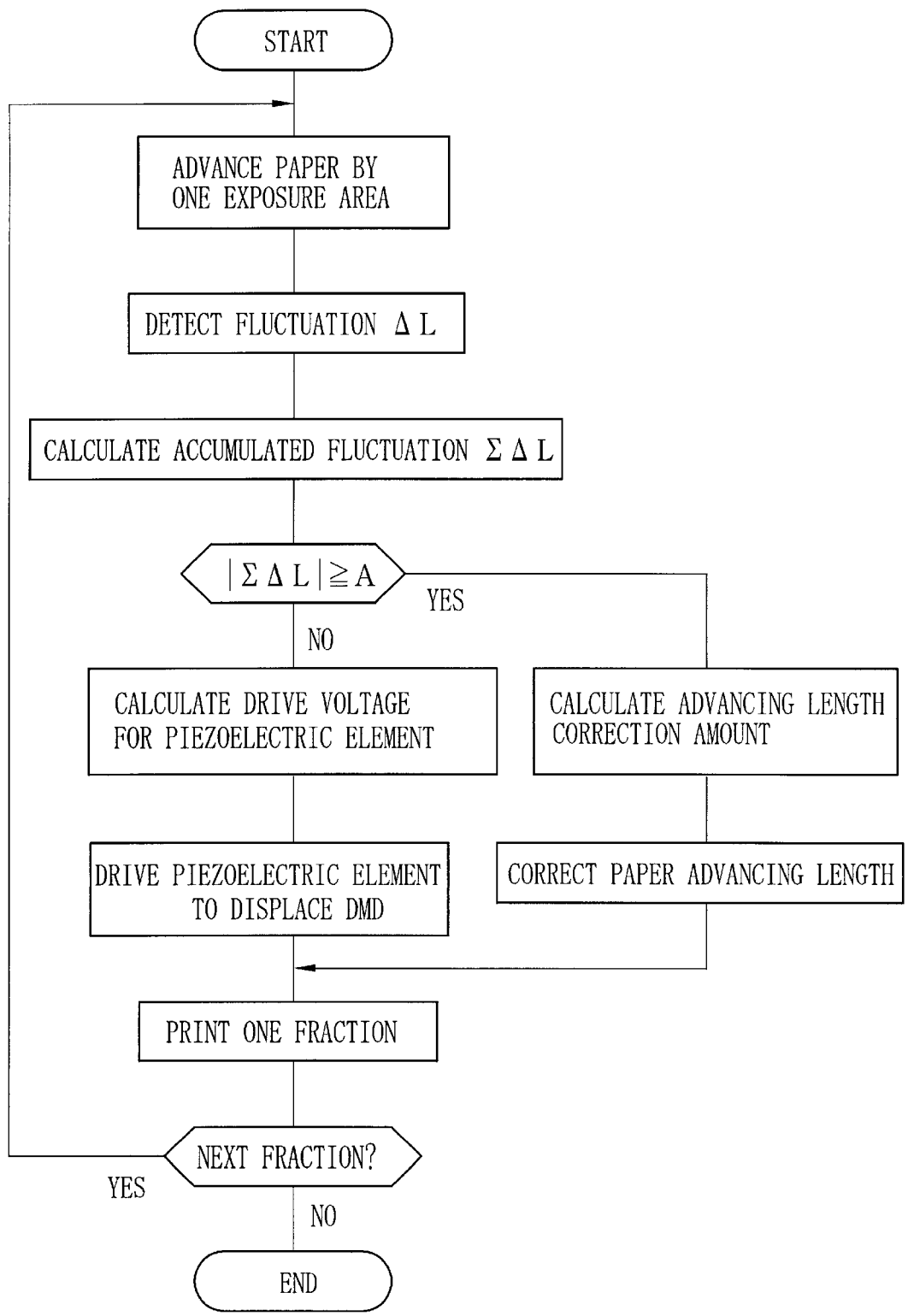
FIG. 8 is a flowchart illustrating an overall operation of the optical printer of the first embodiment.

Now the operation of the above described embodiment will be described with reference to the flow chart of FIG. 8.

First, image data is entered from the image processing apparatus. Next, upon a print command being entered, the controller 6 drives the paper feed motor 41 to place the color photographic paper 15 in the printing station, and then writes a binary "0" in each of the memory cells 11 of the SRAM 10 through the data writing control circuit 60, making every micromirror 12 of the DMD 2 tilt by −θ from their initial horizontal position. Thereafter, the red LED device 25 is driven through the LED driver 33, to illuminate the entire area of the DMD 2 with the red rays.

Next, the controller 7 reads out red image data of a first fraction of a picture frame that is to be recorded first, from the red image memory 56, the fraction corresponding in size to one exposure area. Then the red image data of the first fraction is sent to the data conversion circuit 59, and is converted into mirror drive data for the respective micromirrors 12. The data writing control circuit 60 writes the mirror drive data on the respective memory cells 11 in synchronism with the writing timing signal. Thereby, the micromirrors 12 are each individually switched between the effective reflecting position and the ineffective reflecting position in accordance with the binary value of the mirror drive data written on the corresponding memory cell 11.

The printing light beams reflected from those micromirrors 12 in the effective reflecting position, are focused through the projection lens 35 onto the photosensitive surface of the color photographic paper 15 in a first exposure area placed at that time in the printing station. In this way, each micromirror 12 is set to the effective reflecting position for a different time length in total within the printing cycle of one pixel, the time length being in correspondence with a tonal level designated by the allocated image data. As a result, red pixels of different tonal levels are printed in the first exposure area of the color photographic paper 15 in accordance with the red image data of the first fraction, by the printing light beams reflected from the respective micromirrors 12.

After the red pixels of the first fraction are recorded in the first exposure area, the data writing control circuit 60 writes binary "0" on every memory cell 11 of the SRAM 10. Thereafter, green pixels of the first fraction are printed in the first exposure area in the same way as described with respect to the red pixels. And then, the blue pixels of the first fraction are printed in the first exposure area in the same way as for the red pixels. After the printing of three color pixels of the first fraction is finished, the paper advancing section 5 is driven to advance the color photographic paper 15 by one step corresponding to the length L1 of one exposure area in the paper advancing direction. While the color photographic paper 15 is being advanced, the rotary encoder 46 outputs the encoder pulses corresponding in number to the advanced length to the fluctuation calculator 47. The fluctuation calculator 47 calculates a fluctuation value $\Delta L$ by subtracting the present advanced length from the set length L1. The fluctuation value $\Delta L$ detected at each advancing step of the color photographic paper 15 is accumulated during the printing of one picture frame.

Figure 6:
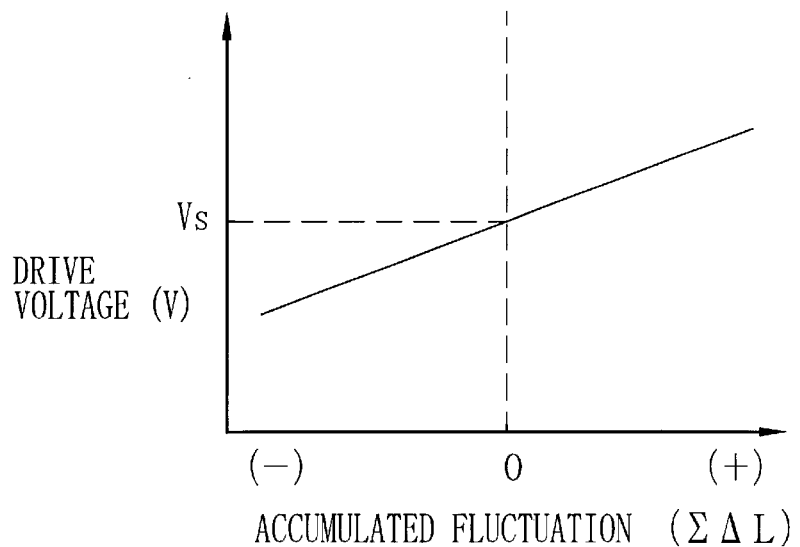
FIG. 6 is a graph illustrating a relationship between accumulated amount of fluctuation in advanced length of a photographic paper and drive voltage.

The correction value calculator 55 derives a drive voltage value for the piezoelectric element 22 from the accumulate fluctuation value $\Sigma \Delta L$ by means of the LUT as shown in FIG. 6, and sends the drive voltage value to the controller 7. Since the fluctuation value $\Delta L$ detected during the first advancing step, i.e. before the printing of the second exposure area, may be regarded as the accumulated fluctuation value $\Sigma \Delta L$, the correction value calculator 55 derives the drive voltage from the fluctuation value $\Delta L$ for correcting the exposure position of the second exposure area.

Then, the controller 7 drives the piezoelectric element 22 through the driver 23 in accordance with the drive voltage determined through the correction value calculator 55. Thereby the piezoelectric element 22 is displaced to incline the swinging plate 20 by an amount to correct the position of a second exposure area for a second fraction of the picture frame such that the second fraction is printed in contact with the first fraction as printed in the first exposure area, without any gap and overlap between these exposure areas, as shown for example in FIG. 9. The following fractions of the picture frame are printed in the same way as above while correcting their exposure positions in accordance with the accumulated fluctuation value $\Sigma \Delta L$.

Figure 9:
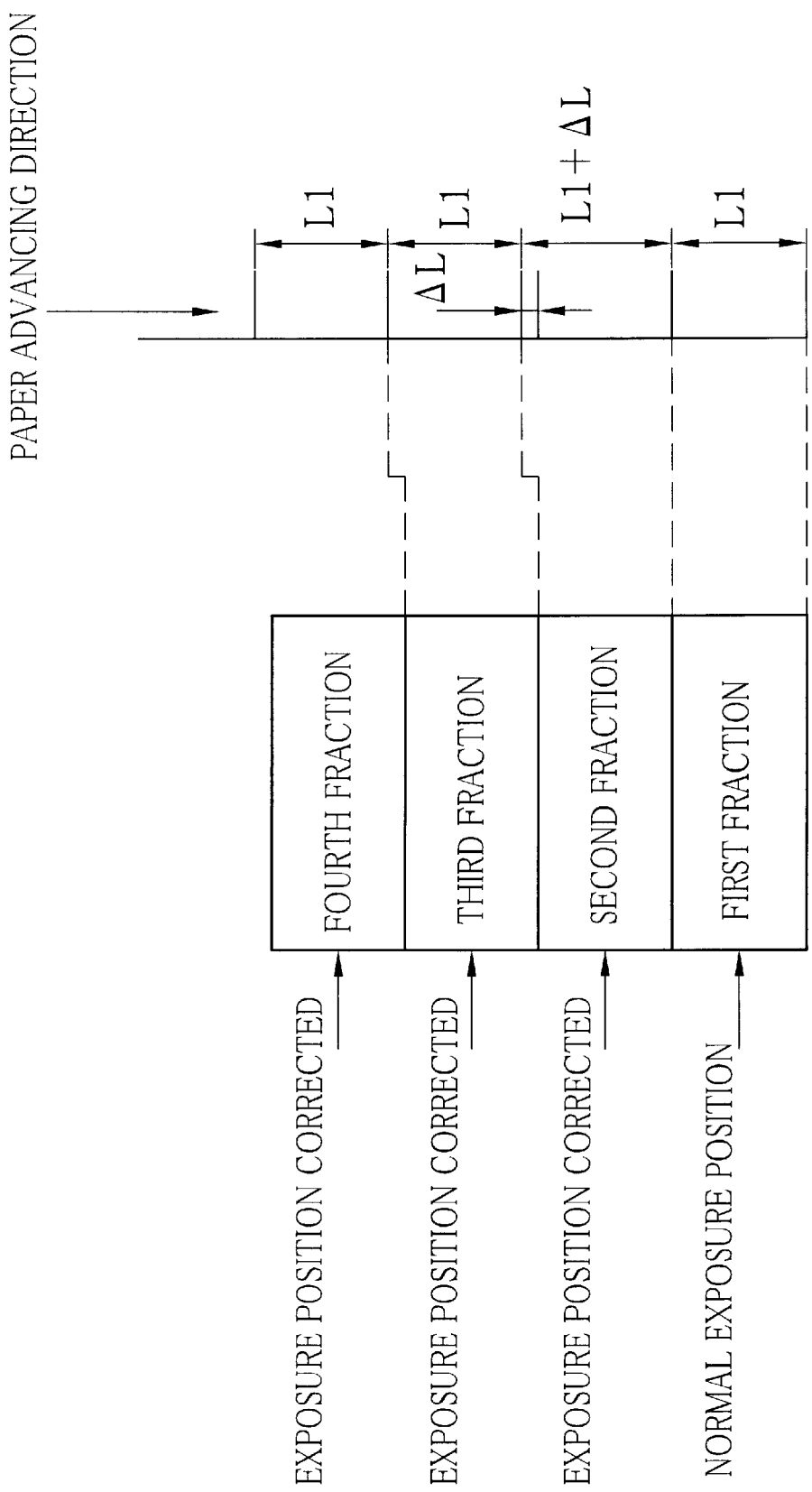
FIG. 9 is an explanatory diagram illustrating an example of correction of exposure positions on the basis of fluctuation in advanced length of the photographic paper.

In the example shown in FIG. 9, because the advanced length fluctuates from the set length L1 only during the first advancing step, the same drive voltage as applied during the printing of the second fraction is applied across the piezoelectric element 22, so the exposure position for the second to fourth fractions are shifted respectively by the fluctuation value $\Delta L$ from the normal exposure position. However, if the advanced length fluctuates so large or so many times that the absolute value of the accumulated fluctuation value $\Sigma \Delta L$ goes above a level "A" correctable by the displacement through the piezoelectric element 22, the controller 7 controls the paper feed motor 41 such that the color photographic paper 15 is advanced by a length for the next step that is determined by subtracting the accumulated fluctuation value $\Sigma \Delta L$ from or adding it to the set length L1, to reset the accumulated fluctuation value $\Sigma \Delta L$ to zero. So it becomes possible to correct the exposure position by displacement of the piezoelectric element 22.

In the above embodiment, the advancing length of the color photographic paper 15 is corrected to reset the accumulated fluctuation value $\Sigma \Delta L$ to zero when the accumulated fluctuation value $\Sigma \Delta L$ goes beyond a range correctable by the displacement of the piezoelectric element. In alternative, the advancing length may be corrected to reduce the absolute value of the accumulated fluctuation $\Sigma \Delta L$ to be less than the maximum value "A".

Figure 10:
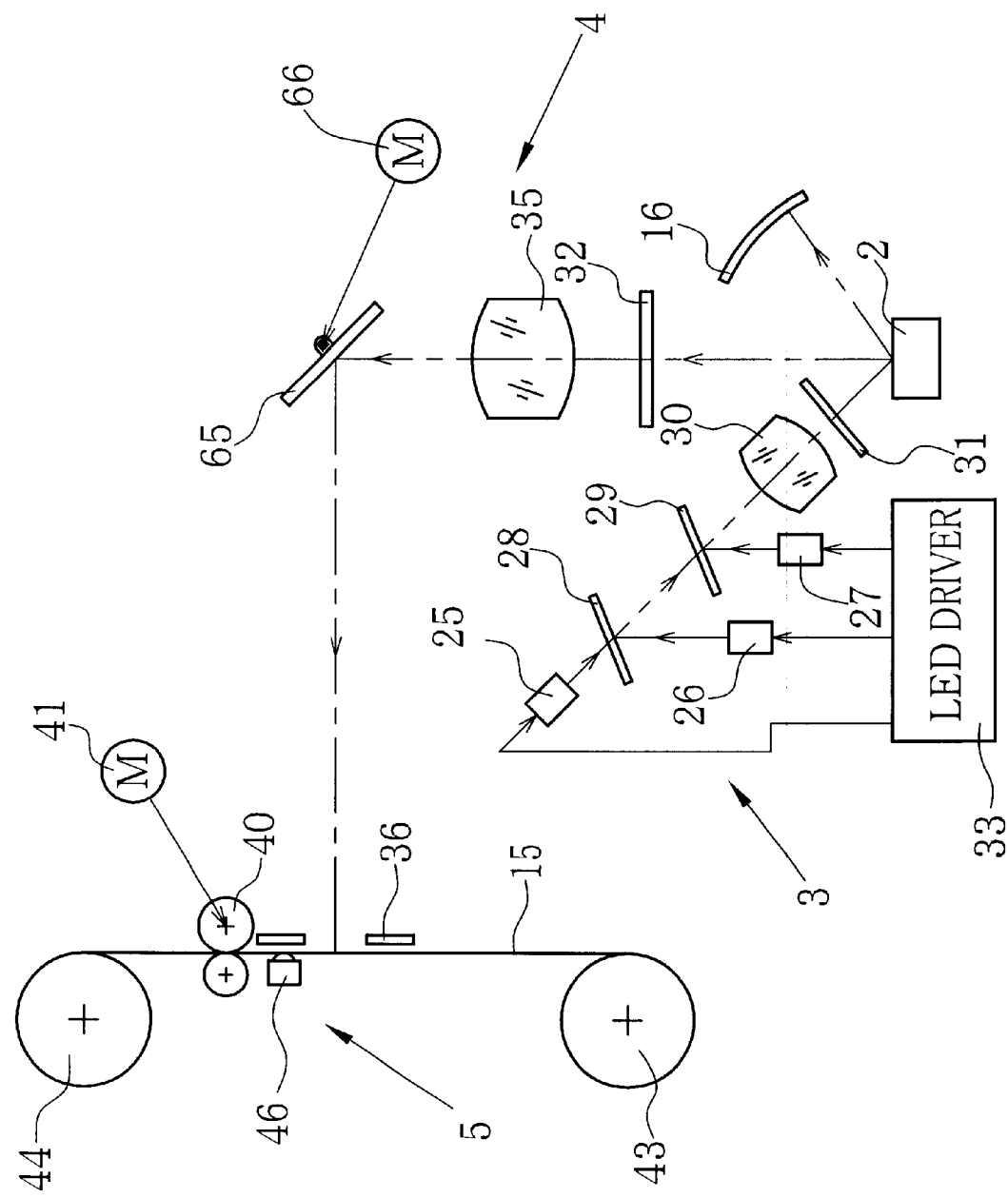
FIG. 10 is a schematic diagram illustrating essential parts of an optical printer according to another embodiment of the present invention.

In the above embodiment, the exposure position correcting section 8 uses the piezoelectric element 22. It is alternatively possible to provide a mirror 65 in the projection optical system 4, as shown in a second embodiment of FIG. 10, for shifting the exposure position so as to prevent the deviation between the exposure areas that is caused by a fluctuation in the advancing speed or advanced length of the color photographic paper 15. In this embodiment, the mirror 65 is turned by a drive motor 66 to change the projecting position of the printing light onto the color photographic paper 15 in accordance with the fluctuation in the advanced length. It is also possible to provide the mirror 65 in addition to the piezoelectric element 22 in the first embodiment. The mirror 65 may be displaced by a piezoelectric element or another fine-adjustment device instead of the drive motor 66.

Although the correction of the exposure position for compensating the fluctuation in the advanced length is carried out by inclining the entire DMD 2 by means of the piezoelectric element 22 in the first embodiment, the piezoelectric element 22 may be replaced by another kind of displacing device. For example, the DMD may be placed on a metal diaphragm that makes the DMD incline by the Coulomb's force generated when a predetermined voltage is applied. It is also possible to use an eccentric cam for displacing the DMD. The mirror 65 may also be displaced by means of the metal diaphragm or the eccentric cam.

Instead of detecting the advanced length directly from the color photographic paper 15 by means of the rotary encoder 46 that is in contact with the color photographic paper 15, it is possible to detect the advanced length of the color photographic paper 15 through rotational amount of the paper feed motor 41.

Although the DMD 2 has the micromirrors arranged in several rows to print several lines at a time in the above embodiment, the present invention is applicable to a case where the micromirrors are arranged in a row, and the picture frame is printed one line after another. Although the size of the exposure area is fixed in the above embodiment, the present invention is applicable to an optical printer where the size of the exposure area may be changed by use of a zoom lens in place of the projection lens of the fixed magnification.

Thus, the present invention is not limited to the above embodiments but, on the contrary, various modifications will be possible to those skilled in the art without departing from the scope of claims appended hereto.

What is claimed is:

1. An optical printer comprising:
    a spatial light modulator having an array of micromirrors arranged in a row or in a matrix, said micromirrors being able to tilt each individually;
    a driving device for driving each of said micromirrors to tilt either to an effective reflecting position or to an ineffective reflecting position in accordance with image data;

a light source section illuminating said micromirrors;

an image projecting optical system for projecting printing light beams from those ones of said micromirrors which are in said effective reflecting position, as an optical image of a predetermined size onto a photosensitive material;

a paper advancing device for advancing said photosensitive material intermittently by a length corresponding to the size of said optical image;

a detection device for detecting fluctuations in advanced length of said photosensitive material by said paper advancing device; and a correction device having a piezoelectric element, wherein the correction device is configured to accumulate said fluctuations so as to determine an accumulated fluctuation value, and wherein the correction device is configured to correct a projecting position of said optical image on said photosensitive material by tilting said micromirrors by means of applying a voltage to said piezoelectric element in accordance with said accumulated fluctuation value.

2. An optical printer as recited in claim 1, wherein said correction device controls said paper advancing device to change the length of advancement of said photosensitive material when the accumulated fluctuation value goes beyond a range correctable by displacement of said spatial light modulator, so as to reduce said accumulated fluctuation value to be within said correctable range.

3. An optical printer as recited in claim 2, wherein said correction device changes an angle of said spatial light modulator relative to an optical axis of said light source section.

4. An optical printer as recited in claim 2, wherein said detection device detects the advanced length of said photosensitive material from a number of pulses generated from a rotary encoder that is in contact with said photosensitive material.

5. An optical printer as recited in claim 2, wherein said light source section projects three color light beams in a color sequential fashion onto all of said micromirrors at a time.

6. An optical printer comprising:

a spatial light modulator having an array of micromirrors arranged in a row or in a matrix, said micromirrors being able to tilt each individually;

a driving device for driving each of said micromirrors to tilt either to an effective reflecting position or to an ineffective reflecting position in accordance with image data;

a light source section illuminating said micromirrors;

an image projecting optical system for projecting printing light beams from those ones of said micromirrors which are in said effective reflecting position, as an optical image of a predetermined size onto a photosensitive material;

a paper advancing device for advancing said photosensitive material intermittently by a length corresponding to the size of said optical image;

a detection device for detecting fluctuations in advanced length of said photosensitive material by said paper advancing device; and a correction device having a piezoelectric element, wherein the correction device is configured to accumulate said fluctuations so as to determine an accumulated fluctuation value, and wherein the correction device is configured to correct a projecting position of said optical image on said photosensitive material by tilting a member of said image projecting optical system by means of applying a voltage to said piezoelectric element in accordance with said accumulated fluctuation value.

7. An optical printer as recited in claim 6, wherein said correction device controls said paper advancing device to change the length of advancement of said photosensitive material when the accumulated fluctuation value goes beyond a range correctable by displacement of said member of said image projecting optical system, so as to reduce said accumulated fluctuation value to be within said correctable range.

8. An optical printer as recited in claim 7, wherein said member of said image projecting optical system is a reflection mirror, and said correction device changes an angle of said reflection mirror relative to an optical axis of said printing light beams from said spatial light modulator.

9. An optical printer as recited in claim 7, wherein said light source section projects three color light beams in a color sequential fashion onto all of said micromirrors at a time.

* * * * *